(12) United States Patent
Nakanishi et al.

(10) Patent No.: US 7,453,175 B2
(45) Date of Patent: Nov. 18, 2008

(54) BRUSHLESS MOTOR

(75) Inventors: Keita Nakanishi, Kyoto (JP); Nakaba Kataoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 379 days.

(21) Appl. No.: 11/401,231

(22) Filed: Apr. 11, 2006

(65) Prior Publication Data

US 2006/0226719 A1 Oct. 12, 2006

(30) Foreign Application Priority Data

Apr. 11, 2005 (JP) ............................. 2005-113477
Apr. 4, 2006 (JP) ............................. 2006-102680

(51) Int. Cl.
*H02K 11/00* (2006.01)
*H02K 23/66* (2006.01)
(52) U.S. Cl. .................................... 310/68 B
(58) Field of Classification Search ............... 310/68 B, 310/112
See application file for complete search history.

(56) References Cited

U.S. PATENT DOCUMENTS

2002/0175574 A1* 11/2002 Okazaki et al. ........... 310/68 B
2003/0030945 A1* 2/2003 Heinonen et al. ......... 360/324.2
2007/0131475 A1* 6/2007 Matsubara ................. 180/443

FOREIGN PATENT DOCUMENTS

| JP | 9-182403 | 7/1997 |
| JP | 2002-354755 | 12/2002 |
| JP | 2003-32989 | 1/2003 |
| JP | 2004-23840 | 1/2004 |
| JP | 2004-129362 | 4/2004 |
| JP | 2005-138670 | 6/2005 |

* cited by examiner

*Primary Examiner*—Javaid Nasri
(74) *Attorney, Agent, or Firm*—Westerman, Hattori, Daniels & Adrian, LLP.

(57) ABSTRACT

A second bracket part for holding a resolver stator of a resolver as position detecting means is inserted in an opening hole in a first bracket part. An expanded part formed in the second bracket part and the opening hole in the first bracket hole are connected to each other with a fixing member. A through hole in which the fixing member for the expanded part is inserted has a circular arc shape. By reducing the fixing strength of the fixing member, the second bracket part can be made movable in the circumferential direction.

10 Claims, 8 Drawing Sheets fig.1 fig.2 fig.3 fig.4 fig.5 fig.6 prior art  fig.7 prior art  fig.8

BRUSHLESS MOTOR

BACKGROUND OF THE INVENTION

1. Technical Field

The present invention relates to a brushless motor and, more particularly, to a motor for an electric power steering device which supports steering effort of a steering wheel of a vehicle.

2. Description of the Related Art

In recent years, electric power steering (EPS) system that supports steering operation by rotating a motor with a vehicle battery is employed. The EPS system is attracting attention as an efficient system with smaller power loss of an engine as compared with the case of generating an oil pressure by rotation of the engine. On a motor used for such an EPS system, a part as position detecting structure is mounted in order to realize high-precision control.

Since the rotary shaft of a motor used for the EPS system is connected to the driver indirectly via a steering wheel, cogging and torque ripple generated from the motor is directly transmitted as an abnormal state of the steering wheel to the driver. Consequently, it is necessary to reduce the cogging and the torque ripple. To solve the problem, a method of accurately disposing position detecting structure has been devised.

Next, conventional structures of the EPS will be described with reference to FIGS. 7 and 8.

Figure 7:
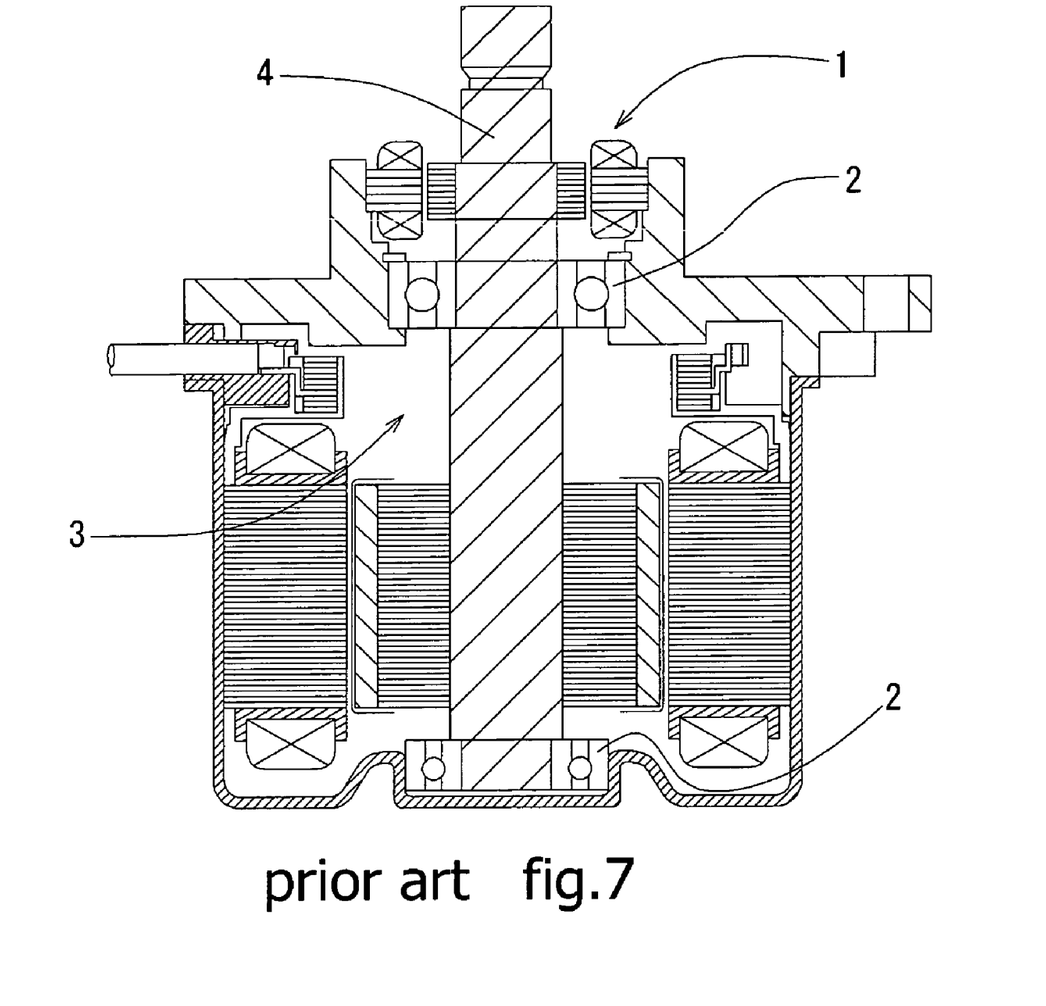
FIG. 7 is a schematic cross section in the axial direction of a conventional motor.

FIG. 7 shows a first conventional structure in which a resolver 1 as position detecting structure is disposed on an axial outside of an inner space of ball bearings 2 axially apart from each other.

In the first conventional structure, however, since the resolver 1 is disposed on the axial outside of a space between a ball bearings 2 axially apart from each other, the space between the ball bearings 2 axially apart from each other has to be narrowed only by a space 3 in the axial direction in which the resolver 1 is disposed. As a result, when the distance between the ball bearings 2 is shortened, accuracy of a shaft 4 attached to the ball bearings 2 cannot be assured. Therefore, the shaft 4 swings and it may cause vibration of the motor. Moreover, in the first conventional structure, the resolver 1 is exposed to the axial outside, so that a circumferential position adjustment of the resolver 1 is performed after the motor is assembled. There is consequently the possibility that a member other than the motor comes into contact with the resolver 1 and the resolver 1 is damaged.

Figure 8:
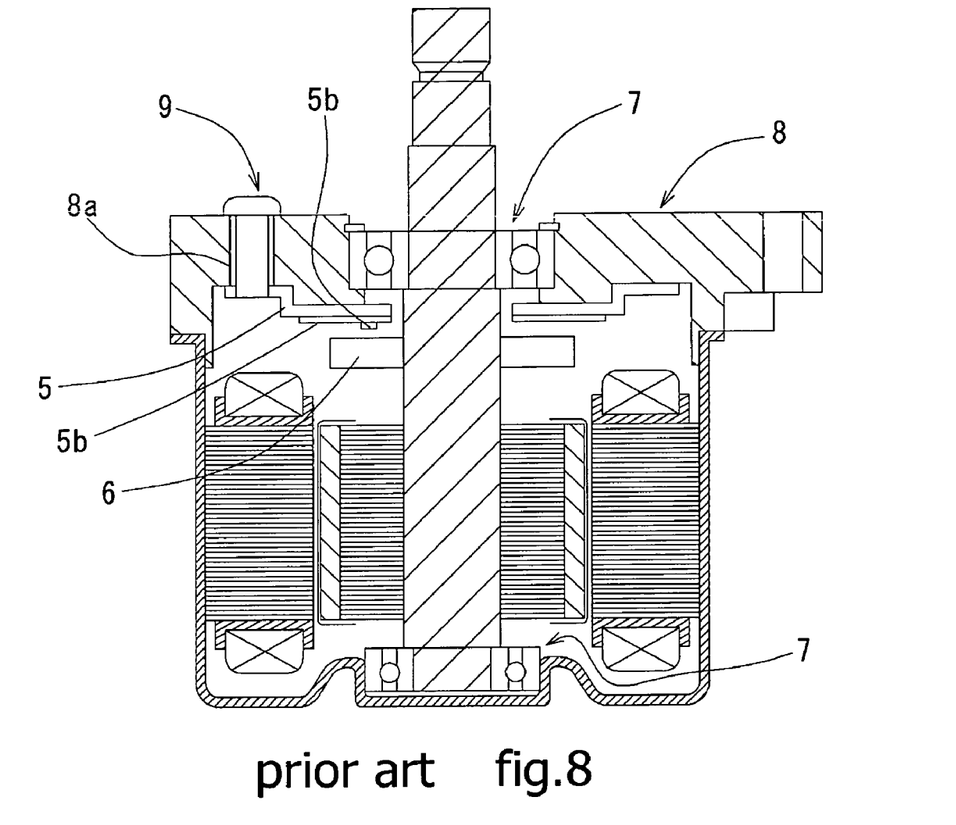
FIG. 8 is a schematic cross section in the axial direction of another embodiment of the conventional motor.

FIG. 8 shows a second conventional structure in which a board holder 5 including a rotation position detecting board 5b on which a hall device 5a as position detecting structure is mounted is disposed on an axial inside of the space between ball bearings 7 axially apart from each other. A sensor magnet 6 is axially disposed so as to face the rotation position detecting board 5b. The board holder 5 is disposed under a bracket 8 and is fixed to the bracket 8 by only three screws 9 screwed from an upper side of the bracket 8. Insertion holes 8a of the screws 9 in the bracket 8 are circumferentially formed in an arc shape. By moving the screws 9 among the insertion holes 8a in the circumferential direction, the circumferential position adjustment of the board holder 5 is performed.

In the second conventional structure, however, after the motor is assembled, there is no member supporting the board holder 5 below the board holder 5. Consequently, the board holder 5 cannot be fixed by being axially sandwiched. The board holder 5 cannot be fixed with reliability, and a low-reliability motor is produced in which the board holder 5 may come off due to motor vibrations, an external collision, or the like. Moreover, since the circumferential position adjustment of the board holder 5 is performed by moving the screw 9 in the circumferential direction, the board holder 5 has to be circumferentially moved by holding the head of the screw 9. It is difficult to move the board holder 5 by holding only the head of the screw 9 and a problem of low workability arises.

BRIEF SUMMARY OF THE INVENTION

The present invention adjusts the position of a resolver stator by dividing a bracket into a second bracket part to which the resolver stator is fixed and a first bracket part fixed to a housing that houses a stator and making only the second bracket part circumferentially movable with respect to the first bracket. In particular, the first and second bracket parts are fixed with a bolt. By forming a through hole in which the bolt is inserted in the second bracket part in a circular arc shape, the second bracket part is allowed to move only by the amount of the circumferential width of the through hole.

According to the invention, the expanded part which is enlarged and has the axial top face of the second bracket part is formed above the axial top face of the first bracket part. Therefore, the operator can move the second bracket part in the circumferential direction by holding the expanded part of the second bracket part. As a result, the efficiency of position adjustment of the resolver stator can be improved.

With respect to the disposing relation between a resolver and a bus bar of the present invention, a bus bar having an opening hole which is disposed above in the axial direction of a stator and a resolver overlap each other. Therefore, axial miniaturization of the motor can be realized.

Further, in the resolver stator, a connection base is formed so as to radially project to the outside. The outermost peripheral face of the connection base is positioned on the outside of the inner peripheral surface of the bus bar. With the configuration, the outside diameter of the resolver stator can be increased, and the number of poles of the resolver stator can be increased.

In a part in the circumferential direction of the bus bar, an enclosing space is formed and encloses the connection base of the resolver stator and a lead wire. By forming the enclosing space, even if the structure in which the resolver and the bus bar overlap each other in the radial direction is employed, the connection base of the resolver stator can be prevented from coming into contact with the bus bar.

DETAILED DESCRIPTION OF THE INVENTION

Figure 1:
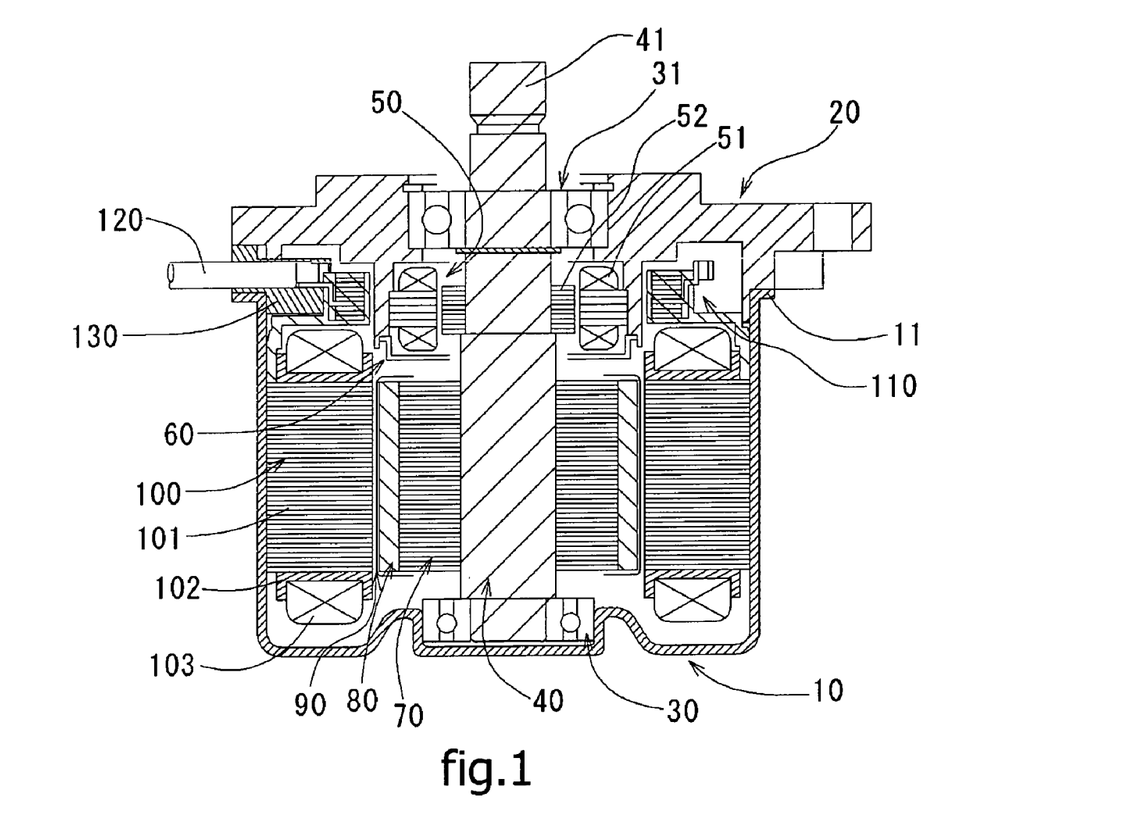
FIG. 1 is a schematic cross section taken in the axial direction of an embodiment of a motor according to the present invention.

FIG. 1 is a schematic cross section showing an embodiment of a brushless motor according to the invention.

Referring to FIG. 1, a housing 10 has an almost cylindrical shape formed by plastic working such as press on a steel sheet or the like and is open axially upward. An end face on the axially upper side of the housing 10, that is, an end face of the opening has an extended part 11 which extends horizontally outward in a radial direction. A bracket 20 obtained by casting an aluminum alloy with a die cast or the like to be formed in an almost hollow cylindrical shape so as to be in contact with the extended part 11 and a part of the cylindrical part on the opening side is fixed.

Ball bearings 30 and 31 are fixed to a lower end face of the housing 10 and in an upper part of an inner cylindrical part 22 which will be described later of the bracket 20, respectively. A shaft 40 is press fit and fixed to the ball bearings 30 and 31 and is supported rotatably. An upper part 41 of the shaft 40 is an output side to which a force is applied in the radial direction. Since a force larger than that to the ball bearing 30 is applied to the ball bearing 31, it is desirable to use a ball bearing of a larger size as the ball bearing 31. In a lower part of the inner cylindrical part 22, a resolver stator 51 of the resolver 50 is fixed. A resolver rotor 52 is fixed to the shaft 40 so as to face the resolver stator 51 with a radial small gap. On an axially lower side of the resolver 50, a shield plate 60 for protecting the resolver 50 from the influence of magnetic fields generated from a stator 100 and a rotor magnet 80 which will be described later is disposed.

The resolver stator 51 of the resolver 50 is formed by stacking a plurality of thin magnetic steel plates in the axial direction. The resolver stator 51 is constructed by a core back disposed in the inner cylindrical part 22 and a plurality of teeth circumferentially provided at equal intervals and extended from the core back to the inside in the radial direction. The teeth are covered with an insulator (not shown) made of an insulating material. A conductive wire is wound a predetermined number of times around each of the teeth via the insulator, thereby forming a coil. The number of turns for forming the coil varies according to the teeth. The resolver rotor 52 fixed to the shaft 40 is formed by axially stacking a plurality of thin magnetic steel plates. The resolver rotor 52 has a not-complete round shape. The gap between the inner peripheral surface of the teeth of the resolver stator 51 and an outer peripheral surface of the resolver rotor 52 is not circumferentially uniform, and a predetermined gap patter is formed.

The shaft 40 is inserted in the hollow of a rotor yoke 70 having a hollow cylindrical shape and is fixed. The rotor magnet 80 is fixed to the outer peripheral surface of the rotor yoke 70. A rotor cover 90 is axially fixed to the outer peripheral surface of the rotor magnet 80 and both end faces of the rotor yoke 70. A rotary part is constructed by the shaft 40, the rotor yoke 70, the rotor magnet 80, and the rotor cover 90.

The annular stator 100 is inserted in and fixed to the cylindrical part of the housing 10 so as to face the rotor cover 90 with a radial small gap. The stator 100 is formed by pressing or the like, an insulator 102 formed of an insulating member is fit to a stacked core 101, and a coil 103 is wound on the insulator 102.

A bus bar 110 having therein a wiring board for supplying a current for driving to the coil 103 of the stator 100 is attached above the stator 100. The bus bar 110 is connected to the coil 103 and a wire 120 extended to the outside. The bus bar 110 is radially disposed so as to envelope the resolver stator 51 of the resolver 50.

A current is supplied from the wire 120 to the stator 100 via the bus bar 110, thereby generating a magnetic field in the stator 100. By mutual action between the magnetic field and the rotor magnet 80, a torque is generated in the shaft center, and the rotary part rotates.

Bracket, Ball Bearing, and Resolver

Figure 2:
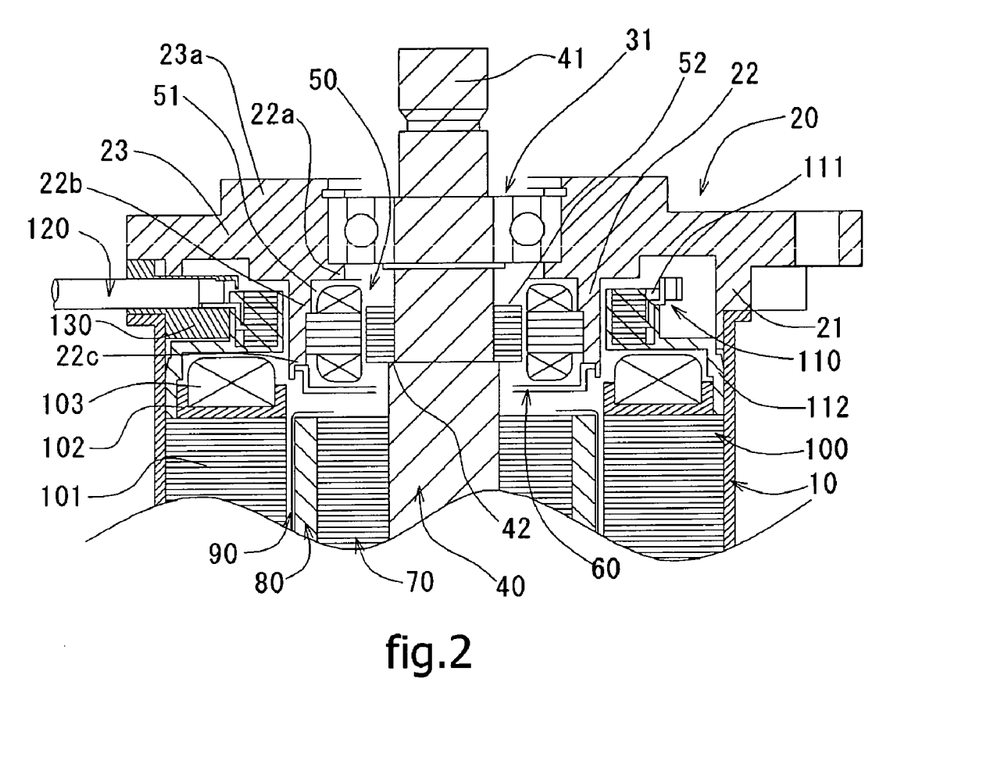
FIG. 2 is a schematic cross section taken in the axial direction showing a main part of the embodiment of the motor according to the invention.
Figure 3:
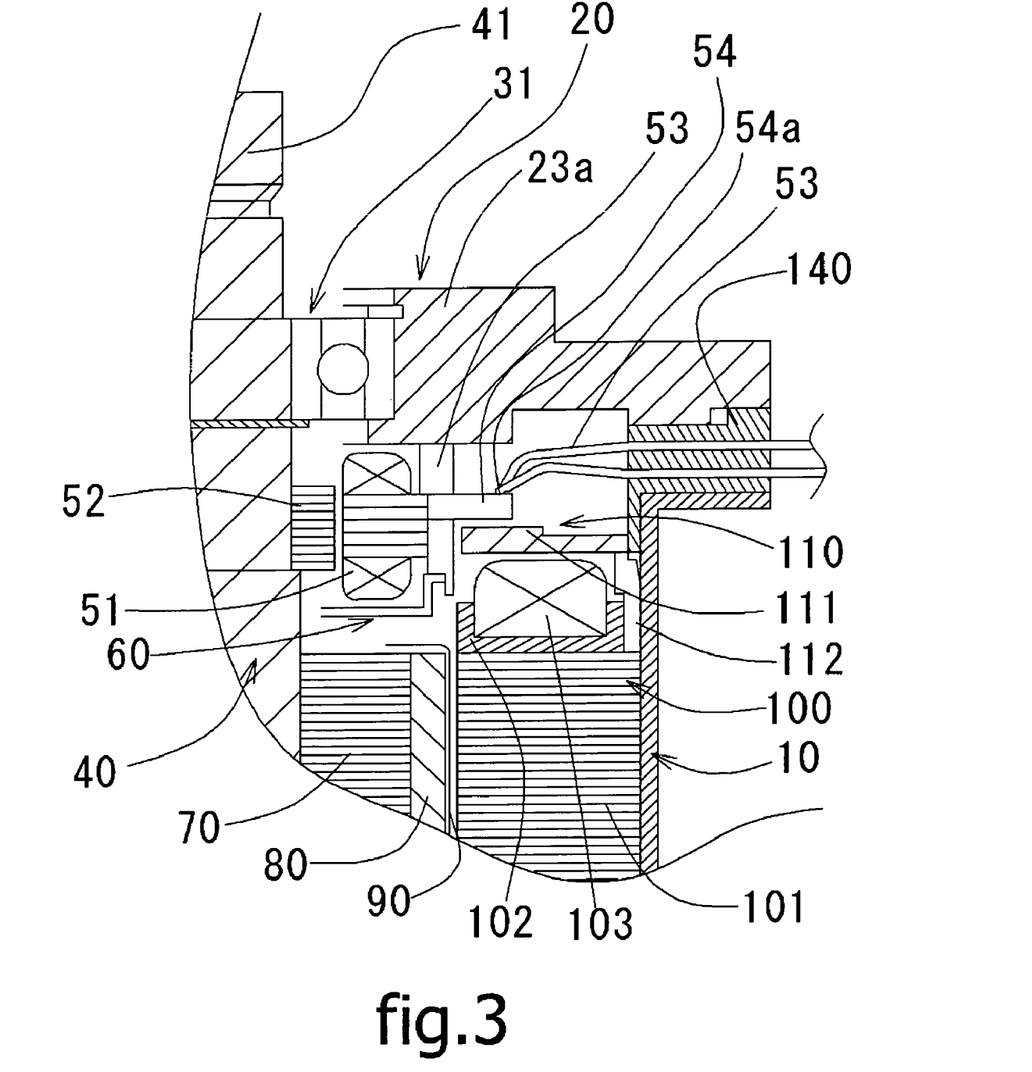
FIG. 3 is a schematic cross section taken at an angle different from that in FIG. 2 in the circumferential direction.

Next, the ball bearing 31 fixed to the bracket 20 and the resolver 50 as a main part of the present invention will be described with reference to FIG. 2. FIG. 2 is an enlarged cutaway view of the stator 100 in FIG. 1 and an axially upper part. FIG. 3 is a schematic cross section taken at an angle different in the circumferential direction from that in FIG. 2, and shows a lead wire 53 of the resolver 50.

Referring to FIG. 2, the bracket 20 is constructed by an outer cylindrical part 21 attached to the housing 10, the inner cylindrical part 22 in which the ball bearing 31 and the resolver 50 are disposed, and a cover 23 coupling the outer and inner cylindrical parts 21 and 22. A recess is formed in a part extending to the outside of the motor of the wire 120 in the outer cylindrical part 21, and a bush 130 is fixed to the recess. A through hole is formed in the bush 130, and the wire 120 passes through the through hole and extends to the outside of the motor. In the resolver stator 51 of the resolver 50, the lead wire 53 for sending a position detection signal to the outside of the motor extends to the outside of the motor. Like the wire 120, a recess is formed also in the part in which the lead line 53 extends in the bracket 20, and a bush 140 having a through hole is fixed to the recess (refer to FIG. 3). The lead wire 53 of the resolver stator 51 passes through the through hole to the outside of the motor. In place of the through hole, a recess may be formed in the bush 130.

In the inner cylindrical part 22, a first step 22a for positioning the ball bearing 31 and a second step 22b for positioning, on an axially lower side of the first step 22a, with which the annular resolver stator 51 of the resolver 50 comes into contact are formed. Further, on the axially lower side of the second step 22b, a third step 22c to which the shield plate 60 comes into contact is formed. The shield plate 60 has an almost cylindrical shape surrounding the outer periphery and the lower end face of the resolver stator 51. By the shield plate 60, the influence of both of the magnetic field from the stator 100 and the magnetic flux of the rotor magnet 80 can be avoided. A through hole is formed in a part of the inner cylindrical part 22. The lead wire 53 of the resolver stator 51 extends through the through hole to the outer cylindrical part 21.

In the center of the cover 23, a step 23a axially arising is formed. At the time of attaching the motor, the step 23a is fit to a mounting hole (not shown) of the outer side, thereby positioning the shaft 40.

In the axially same position as the resolver stator 51 fixed to the inner cylindrical part 22, the bus bar 110 is disposed so as to enclose, that is, the inner cylindrical part 22 and the resolver stator 51 are disposed so as to be inserted in an opening hole in the bus bar 110. A part of the resolver stator 51 overlaps the stator 100 in the radial direction. The bus bar 110 is constructed by a bus bar body 111 disposed in the axially same position as that of the resolver stator 51 and a leg 112 extending downward in axial direction so as to be fixed to the stator 100. By the structure in which the bus bar 110 and the resolver 50 overlap each other in the radial direction, as compared with the structure in which the resolver 50 is disposed above the bus bar 110, the axial length of the motor can be shortened only by the amount of the axial overlap portion between the bus bar 110 and the resolver 50, that is, only by the amount of the axial space of the resolver 50. In the case where the axial length of the motor 50 is not shortened, the amount can be used to increase the stack thickness of the core 101 of the stator 100. The axial length of the rotor magnet 80 radially facing can be increased only by the amount of the stack thickness of the core, and the number of turns of the coil 103 can be increased without changing the axial length of the core 101 and the rotor magnet 80. As a result, as compared with a motor having the same motor size and having the structure in which the resolver 50 is disposed above the bus bar 110, a motor having more excellent magnetic characteristics can be provided.

A recess 111a is formed in a position in which the lead wire 53 extended from the resolver stator 51 is disposed in the bus bar body 111 of the bus bar 110. The lead wire 53 is disposed on the top face of the recess. In the case where the recess is not formed, the lead wire 53 has to be disposed on the top face or the under face of the bus bar body 111 of the bus bar 110 at the time of overlapping the resolver 50 and the bus bar 110 in the radial direction. In the case where the lead wire 53 is disposed on the top face side of the bus bar body 111, the space in which the lead wire 53 passes is necessary, so that it is difficult to reduce the axial size of the motor. In the case where the lead wire 53 is disposed on the under face side of the bus bar body 111, there is the possibility that the lead wire 53 and the coil 103 come into contact with each other. Therefore, the lead wire 53 and the coil 103 may be short-circuited, and a reliable motor cannot be provided. However, in the embodiment, the recess 111a axially housing the lead wire 53 is formed in the top face side of the bus bar body 111, the above two problems can be easily solved. While reducing the axial size of the motor, a reliable motor can be provided.

By fixing the ball bearing 31 on the axial upper side of the resolver 50, an axial interval between the ball bearings 30 and 31 is increased. The configuration allows the shaft 40 to be supported in an axial apart position, so that vibration of the upper part 41 of the shaft 40 can be suppressed and the coaxiality of the step 23a of the cover 23 with the outer peripheral surface and accuracy of the perpendicularity to the top face of the bracket 20 can be improved. The resolver rotor 52 of the resolver 50 is axially disposed in the same position with the resolver stator 51. The positioning can be easily performed because a step 42 is formed in the shaft 40.

Another Example of Bracket

Figure 4:
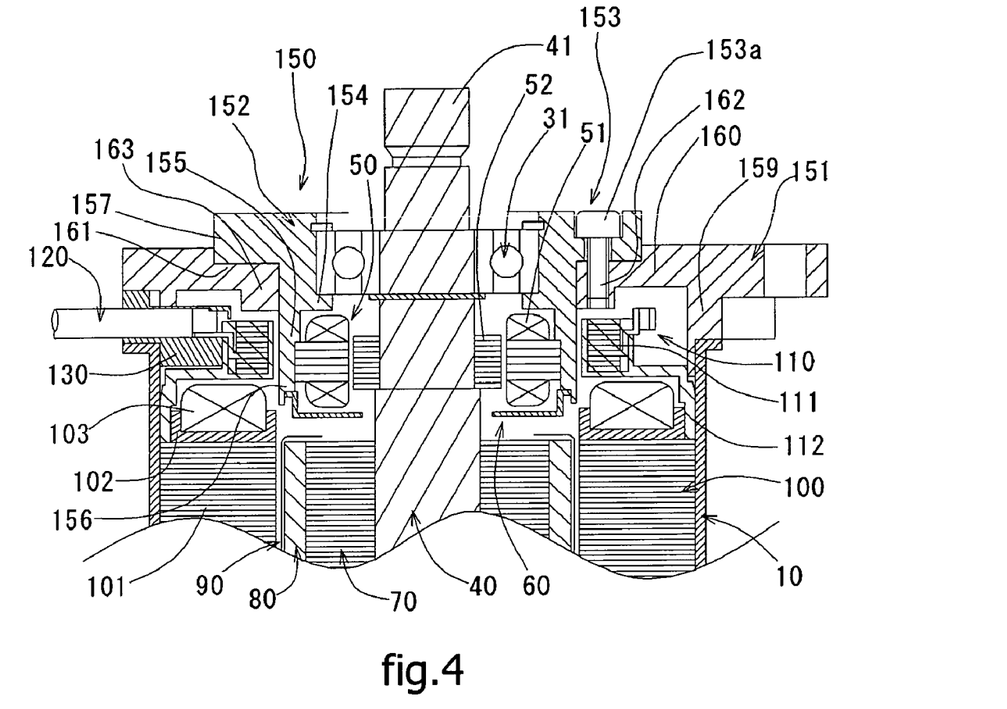
FIG. 4 is a schematic cross section taken in the axial direction showing another embodiment of the motor according to the invention.
Figure 5:
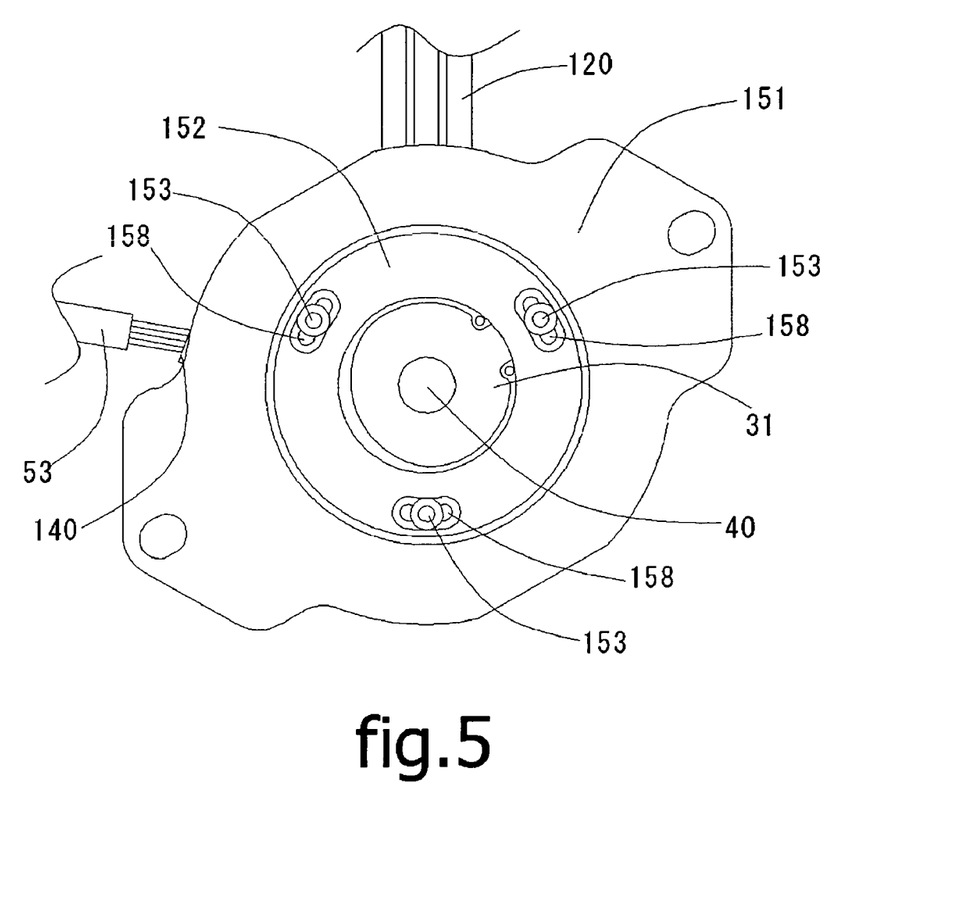
FIG. 5 is a top view showing another embodiment of the motor according to the invention.

The case where the inner cylindrical part of a bracket and a step in a cover are formed of another member will be described with reference to FIGS. 4 and 5. FIG. 4 is an enlarged schematic view of a part similar to that of FIG. 2. The other part of the motor is similar to that of FIG. 1. FIG. 4 is a top view of the motor.

Referring to FIG. 4, a bracket 150 is constructed by a first bracket part 151 fixed to the housing 10 and having an almost cylindrical shape, a second bracket part 152 fixed to the first bracket part 151 and holding the bearing 31 and the resolver 50, and a fixing member 153 for fixing the first and second bracket parts 151 and 152, and having an enlarged part 153a radially expanding in its upper part. In the embodiment, a bolt is used. The enlarged part in the bolt corresponds to a bolt head mating with a tightening tool.

The first bracket part 151 is constructed by a cylindrical part 159 fixed to the housing 10, and a cover 160 having an opening hole 164 formed in an upper end of the cylindrical part 159 and through which the cylindrical part of the second bracket part 152 is inserted, and mating with an expanded part 157 which will be described later. When the inner peripheral surface of the opening hole 164 and the outer peripheral surface of the cylindrical part of the second bracket part 152 come into contact with each other, the radial position of the second bracket part 152 is determined.

A recess 161 for positioning the expanded part 157 in the axial direction is formed in a part of the cover 160. A fixing hole 162 for fixing the fixing member 153 is formed in the recess 161. Although the fixing hole 162 penetrates the recess 161 in the embodiment, it may not penetrate as long as it can fix the fixing member 153. For example, the fixing hole 162 may take the form of a recess. An inner projection 163 having an annular shape is formed in the under face of the inner part of the cover 160 in which the fixing hole 162 is formed. By the inner projection 163, long coupling length between the fixing member 153 and the first bracket part 151 is assured. Therefore, the fixing member 153 can be securely fixed to the first bracket part 151. The inner projection 163 does not always have to be formed in an annular shape. The inner projection 163 may be formed in a portion where at least the fixing hole 162 is formed so as to be circumferentially apart. The shape of the cylindrical part 159, fixing to the housing 10, and fixing to the bushes 130 and 140 are similar to those of the first embodiment.

In the second bracket part 152, a projection 154 projected to a radially inside so as to axially fix the ball bearing 31, and a first step 155 on the radially inner side so as to axially fix the resolver 50 are formed. Further, on the upper side of the resolver 50, a second step 156 on the radially inner side so as to axially fix the shield plate 60 preventing the resolver 50 from the magnetic influence is formed. In an upper end face of the second bracket part 152, the expanded part 157 radially extending to the outside so as to mate with the first bracket part 151 is formed. In the expanded part 157, a plurality of (three in the embodiment) circular opening holes 158 are formed. In the embodiment, each of the circular opening holes has an approximately circular arc shape, as illustrated in FIG. 5.

The bracket 150 is formed by connecting the first and second bracket parts 151 and 152 via the fixing member 153. After the motor is assembled, the fixing strength of the fixing member 153 is reduced once to make the second bracket part 152 circumferentially movable along the circular opening hole 158. As a result, also after the motor is assembled, a circumferential position of the resolver stator 51 of the resolver 50 can be adjusted only by moving the second bracket part 152. When the resolver stator 51 fixed to the second bracket part 152 is circumferentially moved, an axial position and a radial position of the resolver stator 51 is fixed by the recess 161 in the first bracket part 151 so that it is not deviated. Thus, the circumferential position of the resolver stator 51 can be easily adjusted also after the motor is assembled, the motor is driven and, while recognizing the motor characteristics, circumferentially positioning of the resolver stator 51 can be performed. Therefore, a motor with stabilized quality can be provided. Since an axial height of the expanded part 157 of the second bracket part 152 is greater than an axial height of the recess 161 in the first bracket part 151, the worker can hold the outer peripheral surface of the expanded part 157 and easily perform adjustment. In addition, the second bracket part 152 is provided via the ball bearing 31, it can be smoothly moved in the circumferential direction. Further, the second bracket part 152 is reliably fixed by being sandwiched between the expanded part 153a of the fixing member 153 and the first bracket part 151. Therefore, the second bracket part 152 does not come off due to vibration during rotation of the motor, an external collision, or the like. As a result, a high-reliability motor can be provided.

Relation Between Resolver and Bus Bar

Figure 6:
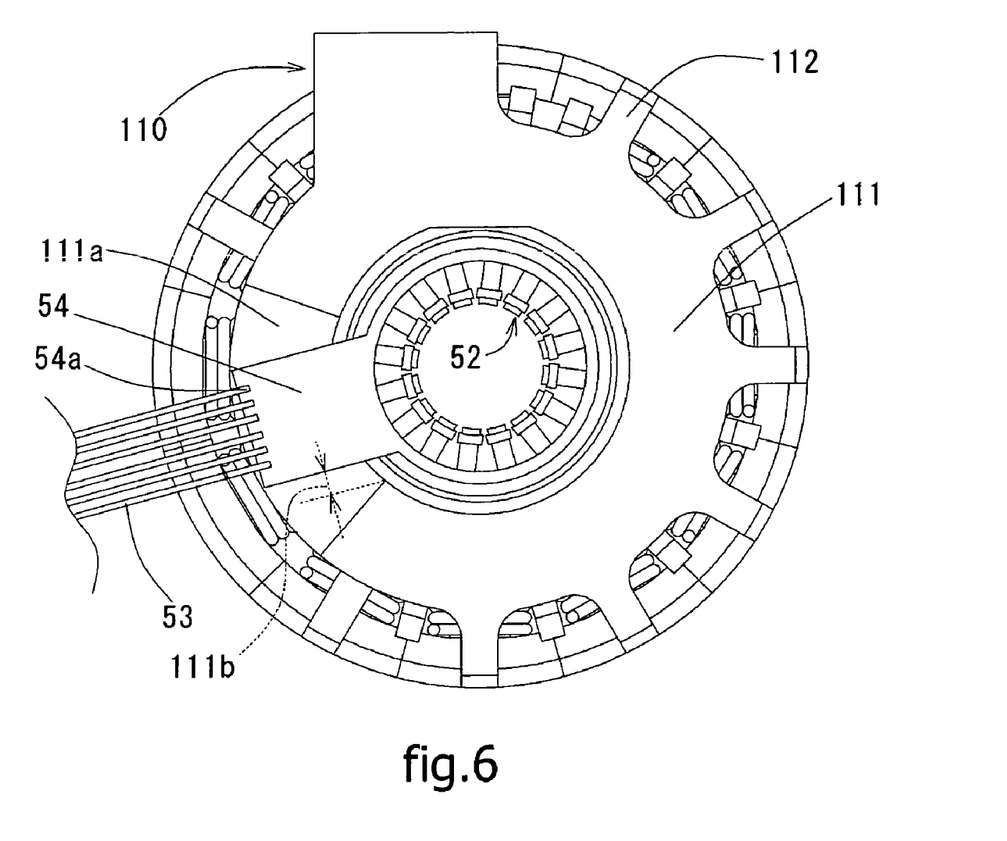
FIG. 6 is a top view showing the layout relation between a bus bar and a resolver according to the invention.

Next, the relation between the resolver 50 and the bus bar 110 will be described with reference to FIG. 6. FIG. 6 is a top view showing the relation between the resolver stator 52 and the bus bar 110.

The bus bar 110 is constructed by the annular-shaped bus bar body 111 and the plurality of legs 112 apart from each other in the circumferential direction. The recess 111a sinking downward in the axial direction is formed in a part in the circumferential direction of the bus bar body 111.

For the resolver stator 52 of the resolver 50, a connection base 54 extending to the outside in the radial direction is provided in a part of the outer periphery in the circumferential direction of the outer peripheral face for connecting the lead wire 53 that sends a signal to an external control circuit (not shown). The connection base 54 has a connection part 54a connected to the lead wires 53. The connection base 54 is disposed above the top face of the recess 111a in the bus bar 110. The outermost peripheral surface in the radial direction of the connection base 54 is positioned on the outside of the inner peripheral surface of the bus bar body 111 of the bus bar 110. The recess 111a and the connection base 54 overlap each other in the axial direction. Therefore, the recess 111a forms a space in which the connection base 54 is enclosed.

Between the side face of the recess 111a in the bus bar 110 and the side face of the connection base 54, a gap 111b is provided. The size of the gap 111b is equal to or larger than the size of the gap for position adjustment in the circumferential direction between the opening hole 158 in the second bracket part 152 and the fixing member 153, which is not shown in FIG. 6. By the relation of the sizes of the gaps, the movement for the circumferential position adjustment of the resolver stator 52 is not limited by the connection base 54 and the recess 111a. Therefore, the resolver stator 52 can be moved smoothly, and accurate position adjustment can be performed.

Although the recess 111a is formed in the bus bar 110 in order to form the enclosure space in the embodiment, another structure may be also employed in which the bus bar body 111 is formed circularly without forming the recess 111a, and the connection base 54 of the resolver stator 52 is disposed in the space in which the bus bar body 111 is not disposed. In this case, the space in which the bus bar body 111 is not disposed is the enclosure space.

Although the embodiment of the present invention has been described above, the invention can be variously modified without being limited to the embodiment. For example, although the resolver 50 is used as the position detecting means of the invention, the means is not limited to the resolver 50 but may be a rotation sensor such as a Hall IC or an MR sensor.

Although a bolt is used in the foregoing embodiment as the fixing member 153 of the invention, the invention is not limited to the bolt. Any fixing member may be used as long as it has an enlarged part in its upper part, such as a screw.

What is claimed is:

1. A brushless motor comprising:
    a shaft;
    a bottomed cylindrical housing disposed coaxially with the shaft, whose bottom is disposed on an axially lower side and whose opening is disposed on an axially upper side;
    a bracket having a first bracket part fixed to the opening in the housing and including an opening hole in a center which is disposed coaxially with the shaft, and a second bracket part having a cylindrical part inserted in the opening hole in the first bracket part and an expanded part formed on the axially upper side of the cylindrical part and having an axial top face protruding from an axial top face of the first bracket part;
    a first bearing part held on the bottom of the housing and fixed to the shaft;
    a second bearing part held by the cylindrical part of the second bracket part and fixed to the shaft;
    a resolver having a resolver stator held by the cylindrical part of the second bracket part and disposed on the axially lower side of the second bearing part, and a resolver rotor fixed to the shaft so as to face the resolver stator via a gap;
    a rotor magnet installed to the shaft, the magnet surrounding the shaft and being rotatable together with the shaft as rigid one assembly; and
    a stator disposed so as to face the rotor magnet via a gap and fixed to an inner peripheral surface of the cylindrical part of the housing,
    wherein a plurality of through holes each having an approximately circular arc shape are circumferentially formed in the expanded part of the second bracket part,
    a fixing hole is formed in an almost radially same position as that of the through hole, in the first bracket part,
    a fixing member is inserted in the through hole in the second bracket part and is screwed in the fixing hole in the first bracket part, and
    the second bracket part is circumferentially movable with respect to the first bracket part.

2. The brushless motor according to claim 1, wherein the first bracket part has an annular wall at the under face thereof surrounding the opening hole, axially extending downward in the axial direction, and
    an outer peripheral surface of the cylindrical part of the second bracket part and an inner peripheral surface of the opening hole in the first bracket part come into contact with each other.

3. The brushless motor according to claim 1, wherein an enlarged part which radially expands is formed in an axially upper part of the fixing member, and
    the second bracket part is fixed by being axially sandwiched by the first bracket part and the enlarged part of the fixing member.

4. A method of manufacturing the brushless motor according to claim 1, wherein after assembling the brushless motor, strength of fixing on the second bracket part which is axially sandwiched between the enlarged part of the fixing member and the first bracket part is reduced so that the second bracket part is circumferentially movable with respect to the first bracket part, thereby adjusting the circumferential position of the resolver stator.

5. The brushless motor according to claim 1, wherein the brushless motor is installed to an electric power steering system.

6. The brushless motor according to claim 1, wherein a bus bar which has an opening hole and connected to the stator is disposed above the stator so as to overlap the resolver in the radial direction,
    the resolver stator is provided with a connection base having a connection part which is connected to a lead wire or a connector,
    the radially outermost peripheral face of the connection base is positioned on the radially outside of the opening hole of the bus bar, and
    an enclosing space for enclosing the connection base is provided for the bus bar.

7. The brushless motor according to claim 6, wherein a recess for making the connection base radially project to the outside is formed in the second bracket part.

8. The brushless motor according to claim 6, wherein circumferential width of a gap formed by the enclosing space and a side face of the connection base is larger than circumferential width of a gap formed by a circumferentially inner peripheral surface of the through hole formed in the expanded part and an outer peripheral surface of the fixing member inserted in the through hole.

9. A method of manufacturing a brushless motor which is installed on an electric power steering system, comprising:
a shaft;
a bottomed cylindrical housing disposed coaxially with the shaft, whose bottom is disposed on an axially lower side and whose opening is disposed on an axially upper side;
a bracket having a first bracket part fixed to the opening in the housing, including an opening hole in a center formed coaxially with the shaft, and having a recess in its periphery which opens axially upward, and a second bracket part having a cylindrical part inserted in the opening hole in the first bracket part and an expanded part formed on the axially upper side of the cylindrical part and having an axial top face protruding from an axial top face of the first bracket part;
a first bearing held on the bottom of the housing and fixed to the shaft;
a second bearing held by the cylindrical part of the second bracket part and fixed to the shaft;
a resolver having a resolver stator held by the cylindrical part of the second bracket part and axially disposed on the lower side of the second bearing, and a resolver rotor fixed to the shaft so as to radially face the resolver stator via a gap;
a rotor magnet fixed to the shaft directly or indirectly; and
a stator disposed so as to radially face the rotor magnet via a gap and fixed to an inner peripheral surface of the cylindrical part of the housing,
wherein circumferentially arranged plural through holes each having an approximately circular arc shape are formed in the expanded part of the second bracket part,
a fixing hole is formed in an almost same radial position as that of the through hole, in the first bracket part,
a bolt has a bolt head which radially expands than a radially width of the through hole is inserted in the through hole except the bolt head in the second bracket part and is screwed in the through hole in the first bracket part and the second bracket part axially sandwiched the bolt head and the first bracket part,
after assembling the brushless motor, strength of fixing on the second bracket part which is axially sandwiched between the bolt head and the first bracket part is reduced so that the second bracket part is circumferentially movable within a range of width of the through hole in the second bracket part with respect to the first bracket part, and
the second bracket part having the expanded part is circumferentially moved while holding the expanded part of the second bracket part, thereby adjusting the circumferential position of the resolver stator.

10. The method of manufacturing a brushless motor according to claim 9, wherein the periphery on the under face side in the opening hole in the first bracket part has an inner projection extending downward in the axial direction, and
an outer peripheral surface of the cylindrical part of the second bracket part and an inner peripheral surface of the opening hole in the first bracket part come into contact with each other.

* * * * *